(12) United States Patent
Maruyama et al.

(10) Patent No.: US 7,752,943 B2
(45) Date of Patent: Jul. 13, 2010

(54) ACTUATOR PROVIDED WITH WAVE REDUCTION GEAR

(75) Inventors: Toshiki Maruyama, Azumino (JP); Takayuki Kojima, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 484 days.

(21) Appl. No.: 11/907,665

(22) Filed: Oct. 16, 2007

(65) Prior Publication Data

US 2008/0098839 A1 May 1, 2008

(30) Foreign Application Priority Data

Nov. 1, 2006 (JP) .............................. 2006-297438

(51) Int. Cl.
*F16H 33/00* (2006.01)

(52) U.S. Cl. ...................................................... 74/640

(58) Field of Classification Search .................. 74/640, 74/411; 475/162, 177, 176
See application file for complete search history.

(56) References Cited

U.S. PATENT DOCUMENTS 5,123,300 A * 6/1992 Himmelein et al. ........... 74/640
5,772,573 A * 6/1998 Hao ............................ 494/15
6,119,553 A * 9/2000 Yamagishi et al. ............ 74/640
6,701,803 B1 * 3/2004 Tamai et al. .................. 74/640
6,817,267 B2 * 11/2004 Kobayashi et al. ............ 74/640

FOREIGN PATENT DOCUMENTS

JP 2005-312223 A 11/2005
JP 2006-149139 A 6/2006

\* cited by examiner

*Primary Examiner*—Roger Pang
(74) *Attorney, Agent, or Firm*—Buchanan Ingersoll & Rooney PC

(57) ABSTRACT

In an actuator (1) in which an angle detector (13) of a magnetic encoder for detecting the rotational position of a motor (3) is incorporated inside a wave reduction gear (5), detection signals from Hall elements (11*a*, 11*b*) of the angle detector (13) are transmitted via sensor lead wires (17) that have been brought out through wiring holes (36*a*, 33*a*, 35*a*, 37*a*) formed inside the motor (3) to a sensor signal converter board (14) disposed on the rear end side of the motor. Since the wiring is not required to be brought out to the exterior, indirectly routed along the exterior of the motor (3), and brought out to the rear side thereof, the wiring is not mechanically damaged and can be brought out with the shortest possible wiring distance, and the effect of electromagnetic noise can be reduced.

7 Claims, 4 Drawing Sheets

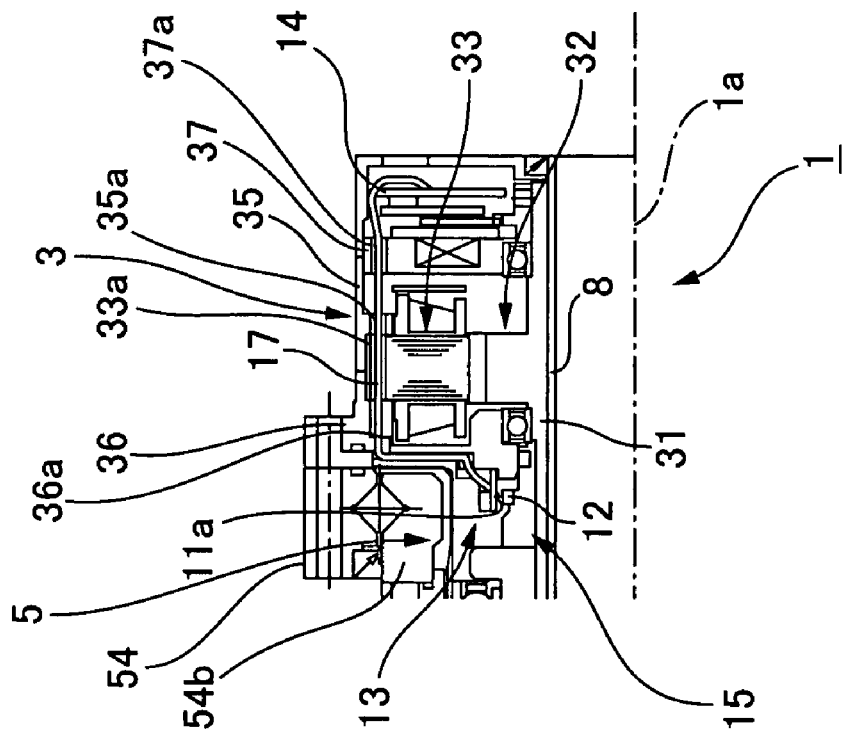
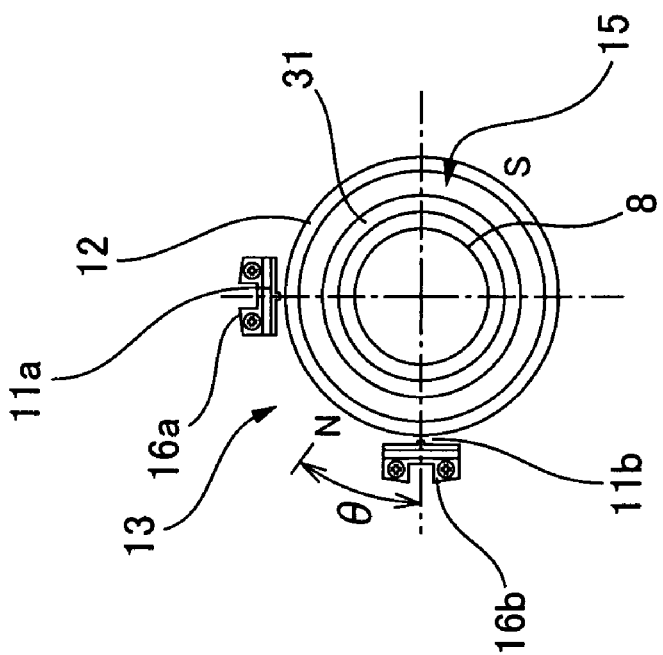

ACTUATOR PROVIDED WITH WAVE REDUCTION GEAR

TECHNICAL FIELD

The present invention relates to a short actuator in which a wave reduction gear is housed.

BACKGROUND ART

A wave reduction gear is composed of an annular rigid internal gear, a flexible external gear disposed therein, and a wave generator which flexes the flexible external gear in the radial direction to mesh with the rigid internal gear and causes to move the meshing position of the gears in the circumferential direction. In an actuator composed of a motor and this wave reduction gear, the rotating shaft of the motor is coaxially connected to the wave generator, and considerably reduced rotations are outputted from the rigid internal gear or the flexible external gear in accordance with the difference in the number of teeth between the two gears.

With an actuator thusly configured, the wave reduction gear is coaxially disposed at the distal end of the motor, and a magnetic position detector is mounted on the rear end portion of the rotating shaft of the motor projecting from the rear end of the motor, as disclosed in Patent Document 1 noted below. However, the configuration in which the wave reduction gear, motor, and position detector are coaxially arranged along the axial direction of the actuator is unsuitable for making the actuator flatter.

In contrast, in the actuator disclosed in Patent Document 2, a configuration is proposed in which a magnetic encoder is mounted in a location on the rotating shaft of a motor positioned inside the wave reduction gear. The interior space of the wave reduction gear can be used as space for disposing a magnetic encoder, whereby the entire length of an actuator can be reduced by an amount commensurate with the axial length of the magnetic encoder.

[Patent Document 1] JP-A No. 2006-149139
[Patent Document 2] JP-A No. 2005-312223

Here, a circuit board on which a sensor signal converter is mounted for processing the detection signals of an angle detector (magnetic sensor) of the magnetic encoder is generally disposed on the rear end side of the motor. When the angle detector of the magnetic encoder is incorporated inside wave reduction gear, the angle detector and the circuit board must be connected by wiring.

SUMMARY OF THE INVENTION

An object of the present invention is to suitably perform wire connections between the angle detector and the circuit board disposed on the rear end side of the motor in an actuator in which the angle detector of a magnetic encoder is incorporated inside the wave reduction gear.

To solve the above and other problems, an actuator provided with a wave reduction gear of the present invention has a motor, a wave reduction gear coaxially connected to the distal end of the motor, and a position detector for detecting the rotational position of a rotating shaft of the motor, wherein the wave reduction gear comprises an annular rigid internal gear, a flexible external gear coaxially disposed inside the rigid internal gear and provided with a cylindrical trunk portion, and a wave generator coaxially fitted inside the flexible external gear;

the rotating shaft of the motor is passed through the interior of the coaxial trunk portion and is coaxially connected and fixed to the wave generator;

the position detector is provided with an angle detecting unit having a sensor magnet mounted on the rotating shaft and a magnetic sensor facing the sensor magnet, and with a sensor signal converter for processing detection signals from the magnetic sensor;

the angle detecting unit is disposed in an axial portion positioned inside the cylindrical trunk portion around the rotating shaft, and the sensor signal converter is disposed at the rear end of the motor;

the motor is provided with a wiring hole whose interior passes through and extends from the angle detector side to the sensor signal converter side; and the angle detecting unit and the sensor signal converter are electrically connected by a wire through the wiring hole.

With the actuator provided with a wave reduction gear of the present invention, detection signals of the magnetic sensor of the position detector are fed to the sensor signal converter disposed in the rear end side of the motor via wiring brought out through wiring holes formed inside the motor. In this manner, wiring is not brought out to the exterior of the actuator and is connected to the sensor signal converter disposed on the side opposite of the wave reduction gear with the motor disposed therebetween.

When wiring brought out from the magnetic sensor is brought out from the wave reduction gear to the exterior and is then brought around to the rear side of the motor, the wiring thus brought out is susceptible to mechanical damage when the actuator is installed and at other times. The detection signals outputted from a Hall element or other magnetic sensor are relatively weak electrical signals, and are therefore adversely affected when the signal wires are brought out because the signals are easily affected by electromagnetic noise. In the present invention, the wiring is not required to be brought out to the exterior, indirectly routed along the exterior of the motor, and brought around to the rear side thereof Therefore, the wiring is not susceptible to mechanical damage and can be brought out with the shortest possible wiring distance, so the effect of electromagnetic noise can be reduced.

Here, the motor rotor of the motor is configured so as to be provided with an annular stator core mounted on the internal peripheral surface of a cylindrical motor frame, a plurality of salient poles protruding from the stator core toward the motor center, and a stator coil wound onto each of the salient poles. A location on the center axis line of the salient poles in the external peripheral side portion of the stator core is an area in which the magnetic flux of the motor is not concentrated, and magnetic saturation therefore does not occur even when though-holes having a suitable size are opened. Therefore, magnetic characteristics are not adversely affected even if wiring holes are formed in these locations parallel to the center axis line of the motor. Such a configuration allows wiring to be performed without increasing the external diameter of the motor.

In lieu of this configuration, grooves that extend in the direction parallel to the motor center axis line are formed in locations on the center line of the salient poles in the external peripheral surface of the stator core; and wiring holes are formed by the grooves and the internal peripheral surface of the motor frame.

Next, the sensor magnet may have a bipolarly magnetized annular shape coaxially fixed to the external peripheral surface of the rotating shaft of the motor, and the magnetic sensor may be composed of first and second Hall elements that face each other at fixed intervals in positions that are separated by 90° in the circumferential direction on the external peripheral surface of the sensor magnet. Also, the sensor signal converter may be configured so as to have an A/D converter whereby analog signals outputted from the first and second Hall elements are converted into digital signals, a computer for computing the rotational angle of the rotating shaft of the motor on the basis of the digital signals thus obtained, and a data converter for converting the rotational angle thus obtained into serial data.

With a position detector having such a configuration, two-phase sinusoidal signals that are offset in phase by 90° of a single cycle per rotation of the rotating shaft of the motor are outputted from the first and second Hall elements, and the absolute angle of the motor shaft can be calculated from these signals.

Analog signals detected by the Hall elements are acquired as digital signals via an A/D converter, the signals are processed to calculate an angle, and the result of the calculation is converted to serial data. Therefore, the number of signal lines to the host apparatus that drives and controls the actuator can be reduced. For example, only four wires, i.e., two power lead wires and two differential signal wires for serial data transfer are sufficient, and a reduction in the number of wires can be achieved.

A host apparatus is not required to hold error compensation data when the sensor signal converter is provided with an angle error data storage unit that stores and holds angle error correction data for correcting the difference between the rotational angle position of the rotating shaft of the motor detected by the first and second Hall elements and the actual rotational angle position of the rotating shaft of the motor.

Next, in the actuator of the present invention, the position detector is provided with a cylindrical sensor magnet holding member coaxially fixed to the external peripheral surface of the rotating shaft of the motor, a multipolarly magnetized annular sensor magnet coaxially fixed to the sensor magnet holding member, and a plurality of magnetic sensors that face each other at fixed intervals in positions separated by a prescribed angle in the circumferential direction on the external peripheral surface of the sensor magnet; and the wave generator of the wave reduction gear is coaxially coupled to the rotating shaft via the sensor magnet holding member.

When the wave generator is direction fastened and fixed to the rotating shaft of the motor, the hollow diameter of a hollow wave generator must be reduced or a separate member for fastening and fixing the wave generator must be mounted in order to assure fastening and fixing strength between the two components. In accordance with the present invention, a wave generator is fastened and fixed to the rotating shaft of a motor with the aid of a sensor magnet holding member. Therefore, the wave generator can be fastened and fixed to the rotating shaft of the motor with sufficient fastening strength without reducing the hollow diameter of the wave generator and without increasing the number of components.

On the other hand, with the actuator of the present invention, the configuration is characterized in comprising an electromagnetic brake that is provided with an electromagnet composed of a yoke and an exciting coil, and an armature that is capable of attraction via the electromagnet, in order to apply brake force to the rotating shaft; and the electromagnet has a location on the external peripheral side thereof that is fastened and fixed to the rear end in the coaxial motor frame of the motor, and a location on the internal peripheral side thereof that rotatably supports the axial portion of the rear end side of the rotating shaft of the motor via a bearing.

In general, an end bracket is disposed at both ends of the cylindrical motor frame and both end portions of the motor rotor are rotatably supported via a bearing in order to rotatably support the motor rotor on the motor stator. With the present invention, the function of the end bracket of the rear end side of the motor is incorporated in the electromagnet of the electromagnetic brake. The axial length of the actuator can thereby be reduced.

With the present invention, detection signals from the magnetic sensor of the angle detector are transmitted via wiring that has been brought out through wiring holes formed inside the motor to the sensor signal converter disposed on the rear end side of the motor in an actuator having a configuration in which the angle detector of the position detector is incorporated inside the wave reduction gear. Therefore, the wiring is not required to be brought out to the exterior, indirectly routed along the exterior of the motor, and brought out to the rear side thereof Therefore, the wiring is not mechanically damaged and can be brought out with the shortest possible wiring distance, so the effect of electromagnetic noise can also be reduced.

BRIEF DESCRIPTION OF THE DRAWINGS

FIG. 2A is a diagram showing the configuration of an angle detector of a magnetic encoder;

FIG. 2B is a diagram showing the wired state of an angle detector of a magnetic encoder and a sensor signal converter;

BEST MODE FOR CARRYING OUT THE INVENTION

An embodiment of the actuator provided with a wave reduction gear in which the present invention has been applied will be described below with reference to the diagrams.

Figure 1:
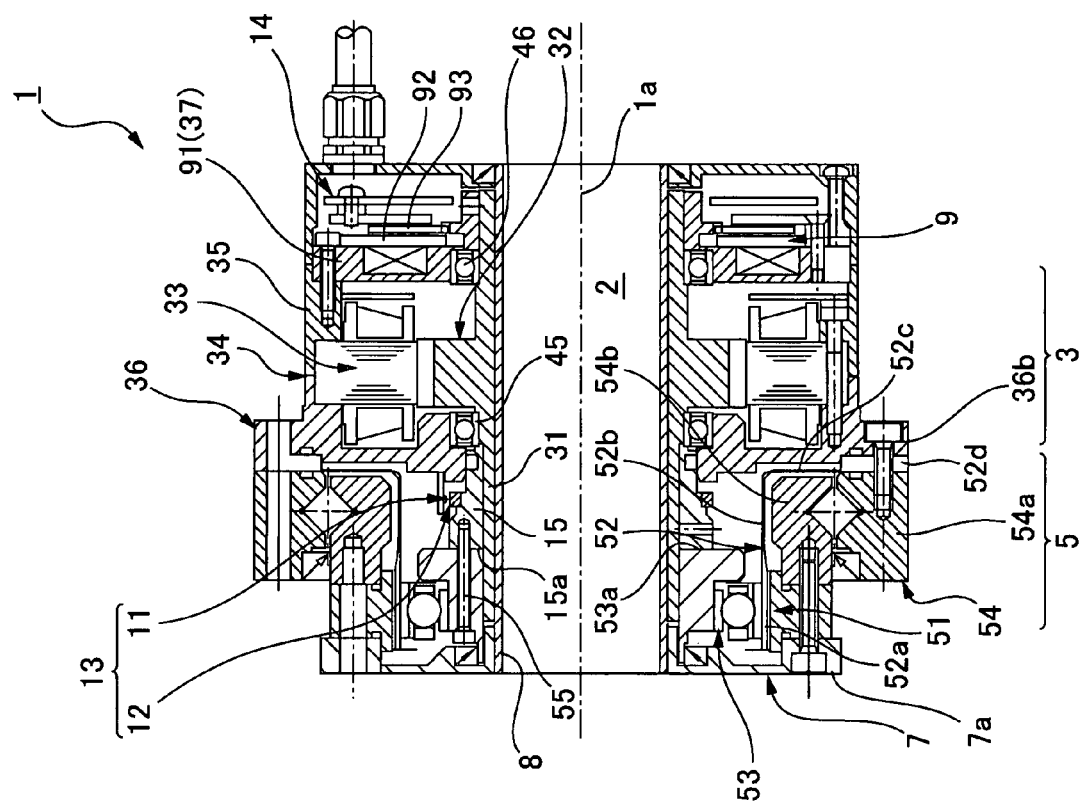
FIG. 1 is a longitudinal sectional view of an actuator in which the present invention has been applied.

FIG. 1 is a longitudinal sectional view showing an actuator provided with a wave reduction gear according to the present invention. The actuator 1 is a hollow actuator in which a circularly cross-sectioned hollow portion 2 passes through the center thereof in the direction of the axis line 1a, and has a motor 3, a wave reduction gear 5 coaxially disposed on the front side thereof, and a discoid output shaft 7 coaxially disposed on the front side thereof The output shaft 7 is coaxially fixed to the external peripheral surface portion of the front end side of a hollow shaft 8 that defines the hollow portion 2. Also, an electromagnetic brake 9 is disposed on the rear side of the motor 3.

The motor 3 is provided with a hollow rotating shaft 3 1, a motor rotor 32 integrally formed with the rotating shaft 31, a motor stator 33 that coaxially encloses the motor rotor 32, and a motor frame 34 on which the motor stator 33 is mounted. The motor frame 34 has a cylindrical frame 35, a front-side end bracket 36 coaxially fixed to the front end thereof, and a rear-side end bracket 37 coaxially fixed to the rear end of the cylindrical frame 35. The motor stator 33 is mounted and fixed to the internal peripheral surface portion of the cylindrical frame 35 and front-side end bracket 36. Bearings 45 and 46 are mounted between the rotating shaft 31 and the internal peripheral end of the front-side and rear-side end brackets 36 and 37, and the motor rotor 32 is rotatably supported by the motor stator 33 via the bearings.

The wave reduction gear 5 disposed on the front side of the motor 3 is provided with an annular rigid internal gear 51, a flexible external gear 52 coaxially disposed therein, and an elliptically contoured wave generator 53 coaxially fitted therein. The rigid internal gear 51 and flexible external gear 52 can rotate relative to each other via a cross roller bearing 54.

The wave generator 53 is fixed to the external peripheral surface portion of the distal side of the rotating shaft 31, and accepts high speed rotations from the motor 3. The flexible external gear 52 is silk-hat shaped and has a cylindrical trunk 52b on which external teeth 52a are formed on the external peripheral surface portion of the distal end side, a diaphragm 52c that widens perpendicularly outward from the rear end of the cylindrical trunk 52b, and an annular boss 52d formed in a continuous fashion on the outer peripheral edge of the diaphragm 52c. The annular boss 52d is positioned between an outer peripheral portion 36b of the front-side end bracket 36 in the motor frame 34 and an outer ring 54a of the cross roller bearing 54 positioned forward of the outer peripheral portion, and the annular boss is sandwiched between these members and tightened and fixed to these members. The rigid internal gear 51 is positioned between the inner ring 54b of the cross roller bearing 54 and an outer peripheral edge portion 7a of the output shaft 7 positioned forward of the inner ring, and the rigid internal gear is sandwiched between these members and tightened and fixed to these members.

Here, a magnetic encoder for detecting the rotational position of the motor rotor 32 is mounted on the motor 3. The magnetic encoder is provided with an angle detector 13 composed of a Hall element 11 and a sensor magnet 12, and a sensor signal converter board 14 on which a sensor signal converter is mounted for processing detection signal obtained from the angle detector 13. The angle detector 13 is disposed inside the wave reduction gear 5 positioned on the front side of the motor 3, and the sensor signal converter board 14 is disposed on the rear side of the electromagnetic brake 9 on the rear side of the motor 3. The angle detector 13 and the sensor signal converter board 14 disposed in the front and rear of the motor 3 are connected by a sensor lead wire disposed inside the motor 3.

FIG. 2A is a diagram showing the configuration of the angle detector 13 of the magnetic encoder. FIG. 2B is a diagram showing the wired state of the angle detector 13 and the sensor signal converter board 14 of the magnetic encoder. Referring to FIGS. 1, 2A, and 2B, the sensor magnet 12 is a bipolarly magnetized annular component in the angle detector 13 of the magnetic encoder and is fixed to the external peripheral surface of an annular sensor magnet holding member 15. The sensor magnet holding member 15 is coaxially tightened and fixed to the external peripheral surface portion in a location between the wave generator 53 and the front-side end bracket 36 in the rotating shaft 31.

The Hall element 11 faces the external peripheral surface of the sensor magnet 12 across a fixed gap. Provided as the Hall element 11 in the present example are a first Hall. element 11a and a second Hall element 11b disposed at angular intervals of 90° in the circumferential direction. The first and second Hall elements 11a and 11b are held by Hall element support plates 16a and 16b, respectively, mounted on the front end surface of the front-side end bracket 36.

Here, the first and second elements 11a and 11b and the sensor signal converter board 14 are connected by a plurality of sensor lead wires 17. The sensor lead wires 17 brought out from the Hall elements 11a and 11b are brought outward in the radial direction between the front end surface of the front-side end bracket 36, and the rear end surface of the inner ring 54b of the cross roller bearing 54. A plurality of wire holes 36a, 33a, 35a, 37a are formed in the direction of the axis line 1a completely through the external peripheral surface portion of the front-side end bracket 36, the motor stator 33, the cylindrical frame 35, and the external peripheral surface portion of the rear-side end bracket 37, respectively. The sensor lead wires 17 are brought out to the rear side of the motor 3 through the wire holes 36a, 33a, 35a, and 37a, and are connected to the sensor signal converter board 14.

The sensor lead wires 17 thus brought out are easily mechanically damaged during installation of the actuator 1 or at other times when the sensor lead wires 17 from the Hall element 11 (11a and 11b) are brought out to the exterior from the wave reduction gear 5 and around to the rear side of the motor 3. The detection signals outputted from the Hall element 11 are relatively weak electric signals, and are therefore adversely affected when the sensor lead wires 17 are brought out because the signals are easily affected by electromagnetic noise. In the present example, the sensor lead wires 17 are not required to be brought out to the exterior, indirectly routed along the exterior of the motor 3, and brought out to the sensor signal converter board 14 of the rear side thereof. Therefore, the sensor lead wires 17 are not mechanically damaged and are brought out with the shortest possible wiring distance, so the effect of electromagnetic noise can be reduced.

Figure 3B:
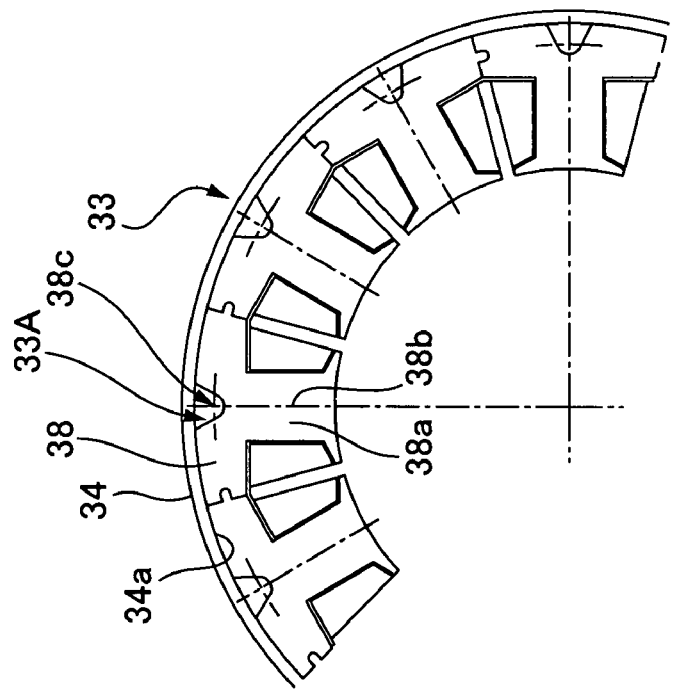
FIG. 3B is a local sectional view showing another example of the wiring holes.
Figure 3A:
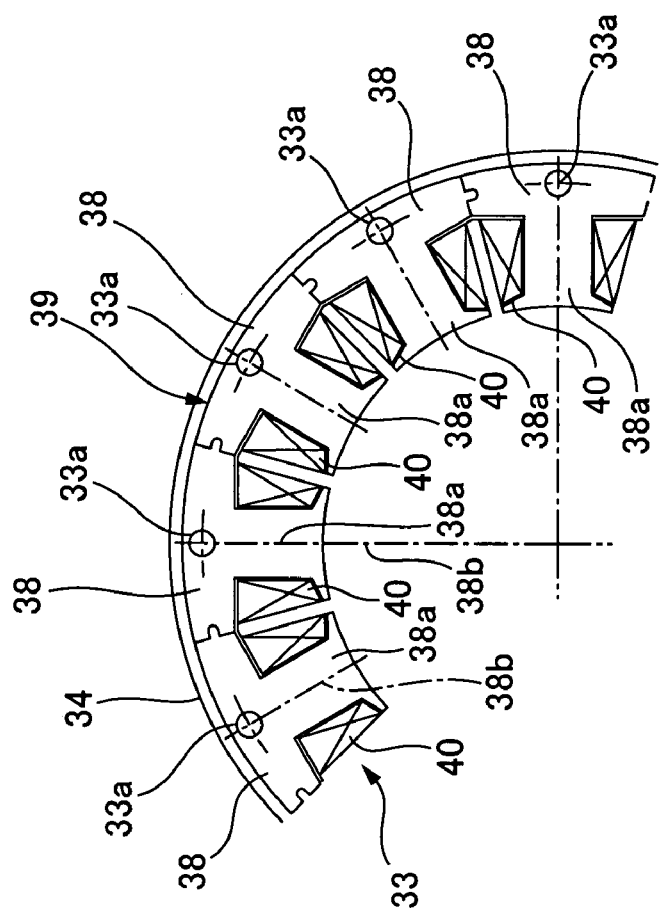
FIG. 3A is a local sectional view showing a motor stator in which wiring holes are formed.

FIG. 3A is a local sectional view showing a motor stator 33 in which wiring holes 33a are formed. The motor stator 33 is provided with a stator core 39 composed of divided cores 38 that are annularly arranged along the internal peripheral surface of the motor frame 34, and stator coils 40 of each phase wound onto salient poles 38a that protrude toward from the internal peripheral surface of the divided cores 38 toward the center of the motor. The circularly cross-sectioned wiring holes 33a pass through a location on the center line 38b of the external peripheral surface portion in the divided cores 38 in the direction parallel to the motor axis line 1a.

The locations on the center axis line 38b of the salient poles 38a in the external peripheral side portion of the stator core 39 is an area in which the magnetic flux of the motor is not concentrated, and magnetic saturation therefore does not occur even when though-holes having a suitable size are formed. Therefore, magnetic characteristics are not adversely affected in these locations even if wiring holes 33a are formed parallel to the center axis line of the motor. Such a configuration allows wiring to be performed without increasing the external diameter of the motor.

The wiring holes 36a, 35a, and 37a formed in the front-side end bracket 36, the cylindrical frame 35, and the rear-side end bracket 37 are formed in positions that correspond to the respective wiring holes 33a formed in the motor stator 33.

Here, the wiring holes formed in the motor stator 33 may also be configured in the manner shown in FIG. 3B. In this diagram, substantially V-shaped grooves 38c are formed in locations on the external peripheral surface position on the center line axis 38b in the divided cores 38. Wiring holes 33A are formed between the grooves 38c and the internal peripheral surface portion 34a of the motor frame 34.

Figure 4:
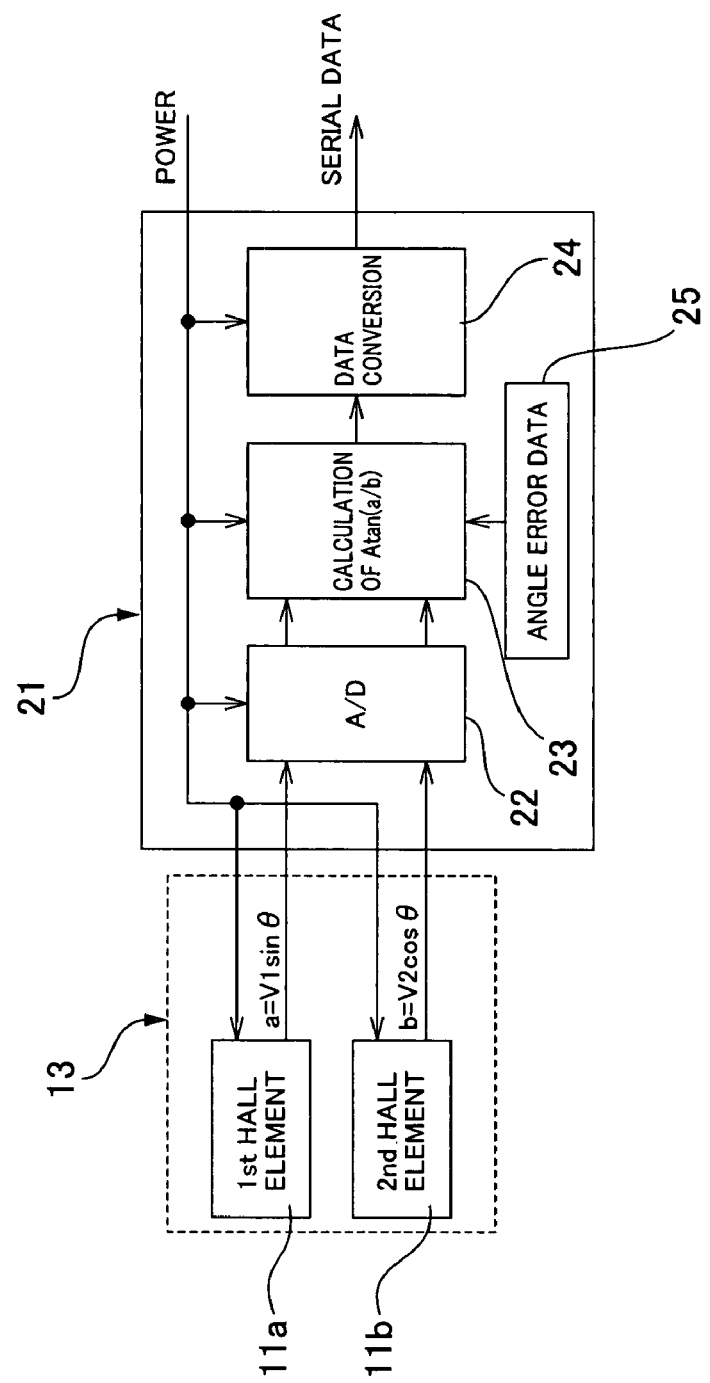
FIG. 4 is a schematic block diagram showing a control system of a magnetic encoder.

Next, FIG. 4 is a schematic block diagram showing the control system of the magnetic encoder of the present invention. A sensor signal converter 21 mounted on the sensor signal converter board 14 comprises an A/D converter 22, a computer 23, a data converter 24, and an angle error data storage unit 25. Sinusoidal analog signals a and b that are offset in phase by 90° are outputted as detection signals from the Hall elements 11a and 11b, and these analog signals a and b are inputted to the A/D converter 22, converted to digital signals, and received in the interior. The computer 23 computes the rotational angle position of the rotating shaft 31 of the motor on the basis of the digital signals.

Angle error correction data that expresses the difference between the rotational angle position detected by the Hall elements 11a and 11b and the actual rotational angle position of the motor rotating shaft 31 is stored in the angle error data storage unit 25 at fixed angle units. With the computer 23, the computed angle is corrected by the angle error correction data. The detected angle computed in the computer 23 is converted to serial data in the data converter 24 and transmitted to the drive control device (not shown) of the host apparatus that drives and controls the actuator 1.

In this manner, the detection angle is converted to serial data and transmitted to the host side, whereby the number of wires between the sensor signal converter 21 and the host side apparatus can be set to a total of four wires, i.e., two power lines and two differential signal lines for serial data transfer. The number of wires is reduced in this manner, and wiring work is thereby simplified. Since the sensor signal converter 21 of the present example holds the error compensation data, the error compensation data for correcting detection errors is not required to be held in the host side apparatus.

(Structure for Mounting a Wave Generator on the Motor Rotating Shaft)

Reverting to FIG. 1, the wave generator 53 of the wave reduction gear 5 of the present example is mounted on the rotating shaft 31 of the motor via the sensor magnet holding member 15 disposed on the rear side thereof. The wave generator 53 is coaxially tightened and fixed to the sensor magnet holding member 15 by bringing the rear-side end surface 53a of the wave generator into contact with the front-side end surface 15a of the sensor magnet holding member 15 and tightening the two with the aid of tightening bolts 55 mounted at prescribed angle intervals in the circumferential direction.

When the wave generator 53 is directly coupled with the rotating shaft 31, the inside diameter of the hollow portion must be reduced in order to increase the thickness of the coupling portions. In the present example, the inside diameter dimension can be increased because the wave generator 53 is coupled to the rotating shaft 31 on the motor with the aid of the sensor magnet holding member 15. There is also an advantage in that the number of components is not increased because separate members are not required to couple these components together.

(Electromagnetic Brake)

The electromagnetic brake 9 disposed on the rear side of the motor 3 will be described next. The electromagnetic brake 9 is provided with an electromagnet 91 that is composed of a yoke and an exciting coil, and the electromagnet 91 is integrally formed with the rear-side end bracket 37 of the motor 3. In other words, the electromagnet 91 of the electromagnetic brake 9 functions as the rear-side end bracket 37 of the motor 3. An armature disk 93 is disposed on the rear side of the electromagnet 91 via a friction plate 92. The friction plate 92 is mounted on the motor stator 33 side and the armature disk 93 is mounted on the motor rotor 32 side. For example, the electromagnetic brake 9 may normally be pressed in the axial direction by a spring member (not shown) and kept in an engaged state. When the brake is excited, these members work against the spring force of the spring member and separate to release the brake.

In this manner, in the present example, the rear-side end bracket 37 that rotatably supports the area of the rear side of the motor rotor 32 is also used as the electromagnet 91 of the electromagnetic brake 9. The configuration is therefore advantageous for giving the actuator 1a flatter profile in comparison with disposing these two members in the direction of the axis line 1a.

The invention claimed is:

1. An actuator provide with a reduction gear comprising:
   a motor;
   a wave reduction gear coaxially connected to a distal end of the motor; and
   a position detector for detecting a rotational position of a rotating shaft of the motor; wherein
   the wave reduction gear comprises an annular rigid internal gear, a flexible external gear coaxially disposed inside the rigid internal gear and provided with a cylindrical trunk portion, and a wave generator coaxially fitted inside the flexible external gear;
   the rotating shaft is passed through an interior of the coaxial trunk portion and is coaxially connected and fixed to the wave generator;
   the position detector comprises an angle detecting unit having a sensor magnet mounted on the rotating shaft and a magnetic sensor facing the sensor magnet, and a sensor signal converter for processing detection signals from the magnetic sensor;
   the angle detecting unit is disposed in a portion positioned inside the cylindrical trunk portion around the rotating shaft, and the sensor signal converter is disposed at a rear end of the motor;
   the motor is provided with wiring holes whose interiors pass through and extend from an angle detecting side to a sensor signal converter side; and
   the angle detecting unit and the sensor signal converter are electrically connected by wires through the wiring holes.

2. The actuator provided with a wave reduction gear according to claim 1, wherein
   the motor has a cylindrical motor frame, an annular stator core mounted on an internal peripheral surface of the motor frame, a plurality of salient poles protruding from the stator core toward a motor center, and a stator coil wound onto each of the salient poles; and
   the wiring holes pass through in a direction parallel to a motor center axis line in locations on a center line of each of the salient poles in an external peripheral side portion of the stator core.

3. The actuator provided with a wave reduction gear according to claim 1, wherein
   the motor has a cylindrical motor frame, an annular stator core mounted on an internal peripheral surface of the motor frame, a plurality of salient poles protruding from the stator core toward a motor center, and a stator coil wound onto each of the salient poles; and
   grooves that extend in a direction parallel to a motor center axis line are formed in locations on a center line of the salient poles in an external peripheral surface of the stator core; and
   wiring holes are formed by the grooves and an internal peripheral surface of the motor frame.

4. The actuator provided with a wave reduction gear according to claim 1, wherein
   the sensor magnet is a bipolarly magnetized annularly shaped magnet coaxially fixed to an external peripheral surface of the rotating shaft;
   the magnetic sensor includes first and second Hall elements that face each other at fixed intervals in positions that are separated by 90° in a circumferential direction on an external peripheral surface of the sensor magnet; and the sensor signal converter has an A/D converter whereby analog signals outputted from the first and second Hall elements are converted into digital signals, a computer for computing a rotational angle of the rotating shaft of the motor on the basis of the digital signals thus obtained, and a data converter for converting the rotational angle thus obtained into serial data.

5. The actuator provided with a wave reduction gear according to claim 4, wherein the sensor signal converter has an angle error data storage unit that stores and holds angle error correction data for correcting the difference between a rotational angle position of the rotating shaft detected by the first and second Hall elements and an actual rotational angle position of the rotating shaft; and the computer corrects the computed rotational angle using the angle error compensation data.

6. The actuator provided with a wave reduction gear according to claim 1, wherein the position detector has a cylindrical sensor magnet holding member coaxially fixed to an external peripheral surface of the rotating shaft, a multipolarly magnetized annular sensor magnet coaxially fixed to the sensor magnet holding member, and a plurality of magnetic sensors that face each other at fixed intervals in positions separated by a prescribed angle in a circumferential direction on an external peripheral surface of the sensor magnet; and the wave generator of the wave reduction gear is coaxially coupled to the rotating shaft via the sensor magnet holding member.

7. The actuator provided with a wave reduction gear according to claim 1, further comprising an electromagnetic brake that has an electromagnet composed of a yoke and an exciting coil, and an armature disk that is capable of attraction via the electromagnet, in order to apply brake force to the rotating shaft; wherein the electromagnet has a location on an external peripheral side thereof that is fastened and fixed to a rear end of a cylindrical motor frame of the motor, and a location on an internal peripheral side thereof that rotatably supports a shaft portion of a rear end side of the rotating shaft via a bearing.

* * * * *